US007645144B2

(12) United States Patent
Tzeng et al.

(10) Patent No.: US 7,645,144 B2
(45) Date of Patent: Jan. 12, 2010

(54) INTERFACE CARD AND BUTTERFLY INTERFACE TRANSFER STRUCTURE

(75) Inventors: Ching-Sung Tzeng, Taipei (TW); Chien-Ying Chen, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 12/400,106

(22) Filed: Mar. 9, 2009

(65) Prior Publication Data

US 2009/0269945 A1 Oct. 29, 2009

(30) Foreign Application Priority Data

Apr. 29, 2008 (TW) .............................. 97115790 A

(51) Int. Cl.
*H05K 1/14* (2006.01)

(52) U.S. Cl. ......................................... 439/65; 361/752

(58) Field of Classification Search ................... 439/65, 439/61, 62; 361/752, 742, 760, 770
See application file for complete search history.

(56) References Cited

U.S. PATENT DOCUMENTS 4,979,075 A * 12/1990 Murphy ................. 361/679.32
6,533,587 B1 * 3/2003 Potter et al. .................... 439/65
6,731,515 B2 * 5/2004 Rhoads ........................ 361/796
6,754,084 B1 * 6/2004 Bolognia et al. ............ 361/752
7,566,227 B2 * 7/2009 Li ............................... 439/65
2003/0049948 A1 * 3/2003 Kim et al. ...................... 439/61
2008/0091980 A1 * 4/2008 Grimes et al. ................. 714/43

FOREIGN PATENT DOCUMENTS

CN 2543229 Y 4/2003

OTHER PUBLICATIONS

English abstract of CN2543229Y.

* cited by examiner

*Primary Examiner*—Gary F. Paumen
(74) *Attorney, Agent, or Firm*—Thomas, Kayden, Horstemeyer & Risley

(57) ABSTRACT

A butterfly interface transfer structure including an interface card, a first add-in card and a second add-in card is disclosed. The interface card includes a plate, a first connector, a second connector and a spacer. The plate has a set of electrical connecting pins, a first surface and a second surface. The first connector is disposed on the first surface, and the second connector is disposed on the second surface, wherein the first connector and the second connector are respectively electrically connected to the electrical connecting pins. The spacer is disposed between the first connector and the plate. The first add-in card is coupled to the first connector, and the second add-in card is coupled to the second connector.

17 Claims, 3 Drawing Sheets

INTERFACE CARD AND BUTTERFLY INTERFACE TRANSFER STRUCTURE

This application claims the benefit of Taiwan application Serial No. 97115790, filed Apr. 29, 2008, the subject matter of which is incorporated herein by reference.

BACKGROUND OF THE INVENTION

1. Field of the Invention

The invention relates in general to a transfer card and a transfer structure, and more particularly to an interface card and a butterfly interface transfer structure.

2. Description of the Related Art

Normally, there are slots disposed on the motherboard of a computer for a user to install required add-in cards. As the design of computer is directed towards miniaturization and the function of computer is broadened, the size of add-in card becomes bigger and bigger. Therefore, interference may occur between the add-in cards disposed on the motherboard.

To resolve the above interference problem, an interface transfer structure such as a riser card has been developed and used in the computer industry. The riser card is inserted into the slot of the motherboard along a direction perpendicular to the motherboard and has more than one transfer slot. An add-in card is electrically connected to the motherboard by way of being coupled to the transfer slot of the riser card along a direction parallel to the motherboard, and thereby the add-in card is disposed parallel to the motherboard.

However, when more than two add-in cards are coupled to the transfer slots disposed on the two sides of the riser card along a direction parallel to the motherboard, interference will occur between the barrier walls of the add-in cards disposed on two opposite sides of the riser card. Therefore, the two riser cards are inserted into two slots that are disposed apart from each other on the motherboard. The barrier walls of the two add-in cards are only partially overlapped so as to avoid the interference between the two add-in cards. However, additional cost is incurred to the interface transfer structure.

Also, as the functions of add-in cards are augmented, there must be enough space for the barrier walls of the add-in cards to receive more components.

SUMMARY OF THE INVENTION

The invention is directed to an interface card and a butterfly interface transfer structure. Connectors of the interface card provide different insertion heights at two sides of the interface card, hence avoiding interference between different components.

According to a first aspect of the present invention, an interface card used for coupling to a slot of a motherboard is provided. The interface card includes a plate, a first connector, a second connector and a spacer. The plate has a set of electrical connecting pins, a first surface and a second surface. The first connector is disposed on the first surface, and the second connector is disposed on the second surface. The first connector and the second connector are electrically connected to the electrical connecting pins. The spacer is disposed between the first connector and the plate.

According to a second aspect of the present invention, a butterfly interface transfer structure including an interface card, a first add-in card and a second add-in card is provided. The interface card coupled to the slot of a motherboard includes a plate, a first connector and, a second connector and a spacer. The plate has a set of electrical connecting pins, a first surface and a second surface. The first connector is disposed on the first surface, and the second connector is disposed on the second surface. The first connector and the second connector are electrically connected to the electrical connecting pins. The spacer is disposed between the first connector and the plate. The first add-in card is coupled to the first connector, and the second add-in card is coupled to the second connector.

The invention will become apparent from the following detailed description of the preferred but non-limiting embodiments. The following description is made with reference to the accompanying drawings.

DETAILED DESCRIPTION OF THE INVENTION

According to the butterfly interface transfer structure of the present embodiment of the invention, a spacer is disposed between a plate and a first connector such that the distance between the top of the first connector and the first surface of the plate differs from the distance between the top of the second connector and the second surface of the plate. The interface card designed in this manner has different insertion heights, hence avoiding the interference between different components when a first add-in card and a second add-in card are both inserted into the interface card. Besides, the area available for the input/output port on the barrier wall of the first or the second add-in card is increased. The invention is exemplified below by way of embodiments. However, the embodiments disclosed below are for exemplification only, not for limiting the scope of protection of the invention. Furthermore, secondary elements are omitted in the following embodiments to highlight the technical features of the invention.

Figure 1:
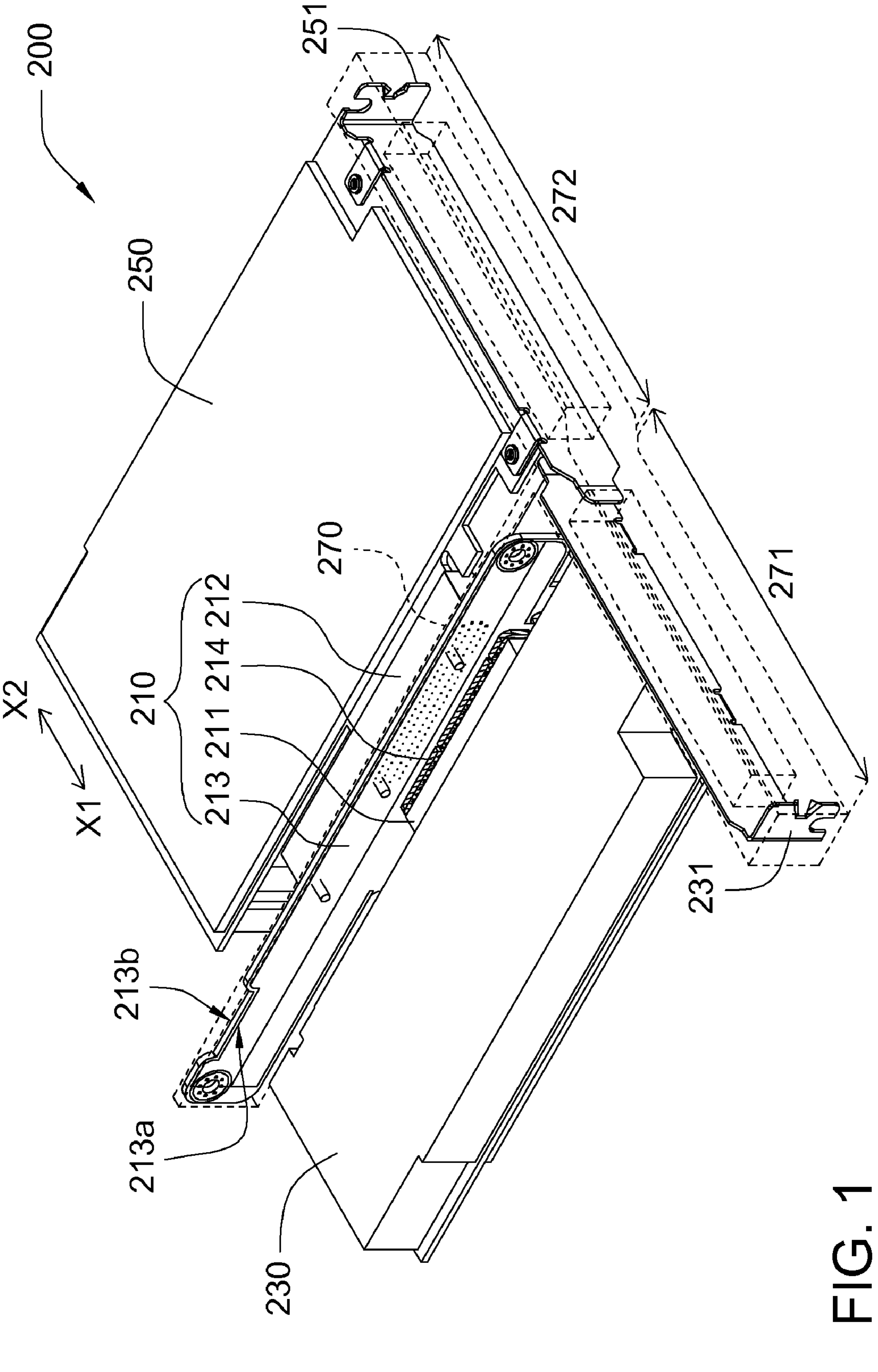
FIG. 1 shows a 3-D diagram of a butterfly interface transfer structure according to an embodiment of the invention.
Figure 2:
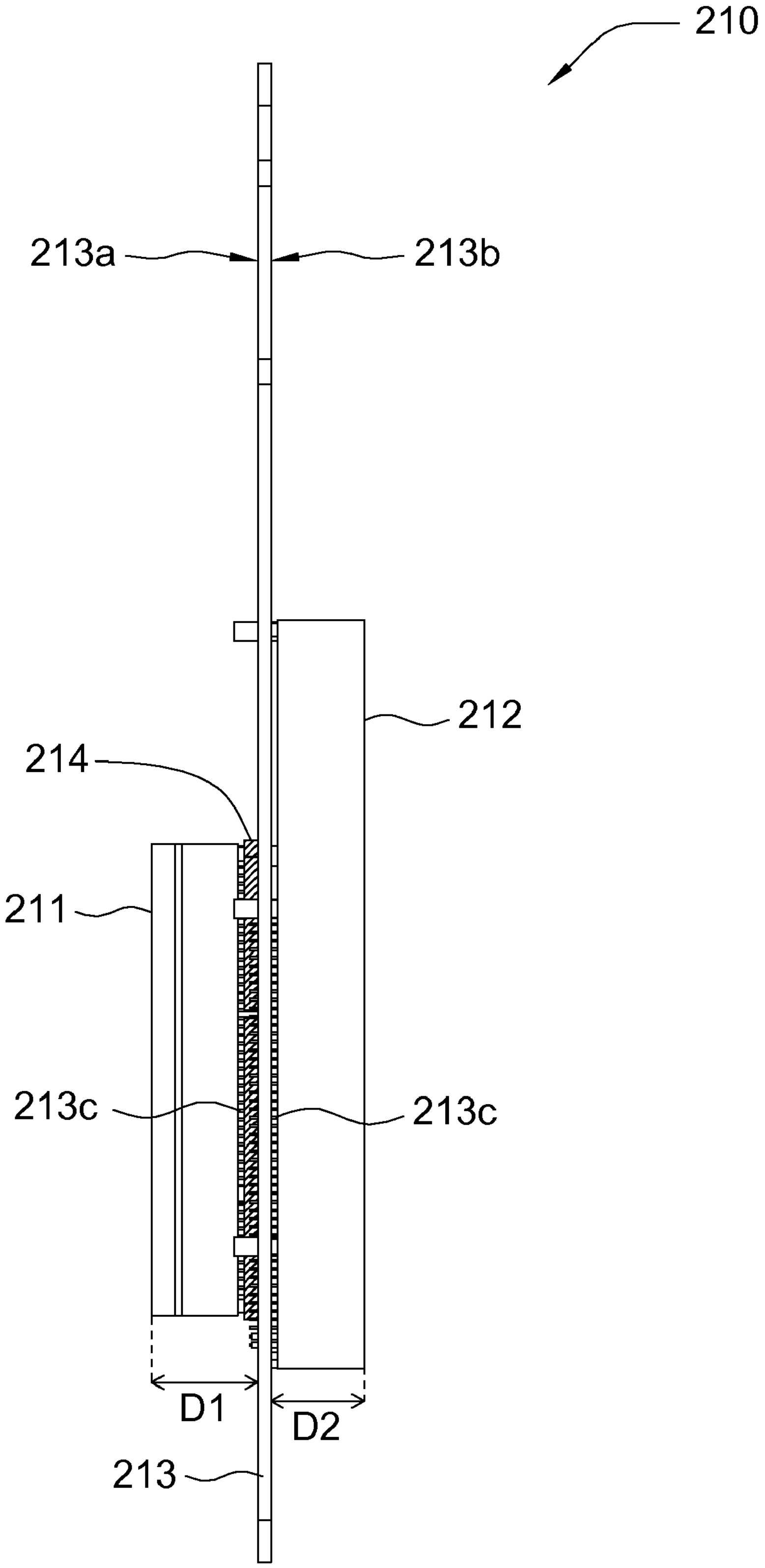
FIG. 2 shows a top view of the interface card in FIG. 1.

FIG. 1 shows a 3-D diagram of a butterfly interface transfer structure according to an embodiment of the invention. FIG. 2 shows a top view of the interface card in FIG. 1. The butterfly interface transfer structure 200 includes an interface card 210, a first add-in card 230 and a second add-in card 250. The interface card 210 coupled to the slot of a motherboard includes a plate 213, a first connector 211, a second connector 212 and a spacer 214. The plate 213 has a set of electrical connecting pins 213*c* (shown in FIG. 2), a first surface 213*a* and a second surface 213*b*. The first connector 211 is disposed on the first surface 213*a*, and the second connector 212 is disposed on the second surface 213*b*. The first connector 211 and the second connector 212 are electrically connected to the electrical connecting pins 213*c*. The spacer 214 is disposed between the first connector 211 and the plate 213. The first add-in card 230 is coupled to the first connector 211, and the second add-in card 250 is coupled to the second connector 212. In the present embodiment of the invention, the first add-in card 230 and the second add-in card 250 are coupled to the first connector 211 and the second connector 212 along a normal direction X1 of the first surface 213*a* and a normal direction X2 of the second surface 213*b*, respectively.

In the present embodiment of the invention, the first connector 211 and the second connector 212 can be implemented by connectors of the same specifications, such as two peripheral component interconnect (PCI) sockets, two peripheral component interconnect express (PCI-E) sockets, two peripheral component interconnect extended (PCI-X) sockets, or other interface interconnect sockets used in a computer system. Or, the first connector 211 and the second connector 212 can be the connectors of different specifications. The spacer 214 is disposed between the first connector 211 and the plate 213, such that the distance D1 from the top of the first connector 211 to the first surface 213*a* and the distance D2 from the top of the second connector 212 to the second surface 213*b* are not the same. In practical application, the first connector 211 and the second connector 212 are substantially of the same height, and have either the same or different number of pins according to actual needs. In the embodiment, the distance D1 from the top of the first connector 211 to the first surface 213*a* is greater than the distance D2 from the top of the second connector 212 to the second surface 213*b*.

Figure 3:
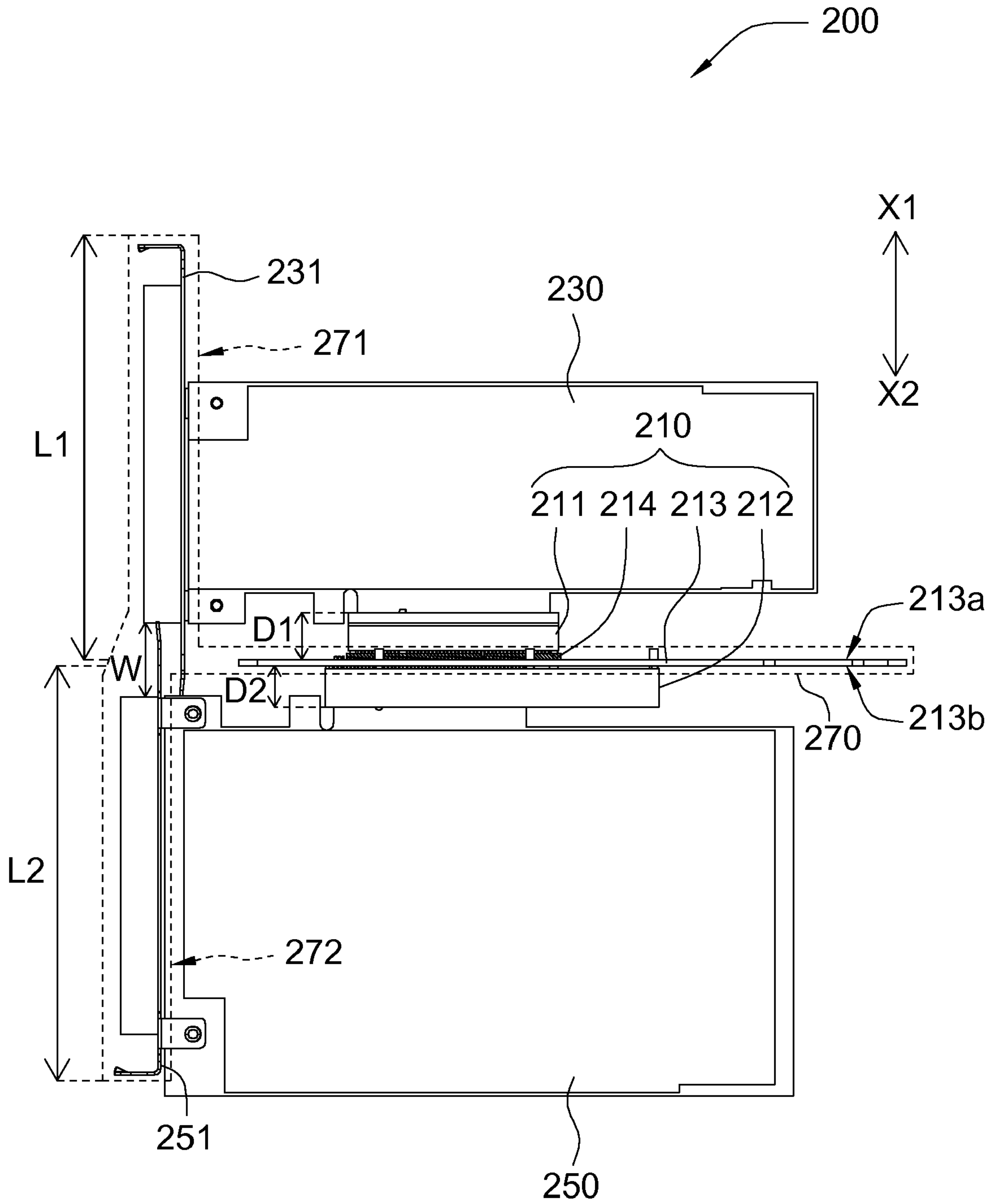
FIG. 3 shows a top view of the butterfly interface transfer structure in FIG. 1.

Referring to FIG. 3, a top view of the butterfly interface transfer structure in FIG. 1 is shown. In the present embodiment of the invention, the first add-in card 230 has a first barrier wall 231 positioned at one side of the first add-in card 230, and the second add-in card 250 has a second barrier wall 251 positioned at one side of the second add-in card 250. The first barrier wall 231 and the second barrier wall 251 correspond to the same end of the plate 213 and face towards the same direction. The butterfly interface transfer structure 200 further includes a frame 270 as shown in FIG. 1. Preferably, the frame 270 is made from a metallic material and has a first connecting arm 271 and a second connecting arm 272, wherein one end of the first barrier wall 231 is fixed on the first connecting arm 271, and one end of the second barrier wall 251 is fixed on the second connecting arm 272. The first barrier wall 231 and the second barrier wall 251 are screwed and fixed on the first connecting arm 271 and the second connecting arm 272 respectively for example. The first add-in card 230 and the second add-in card 250 can be firmly connected to the plate 213 by way of being coupled to the first connector 211 and the second connector 212 respectively as well as being fixed on the first connecting arm 271 and the second connecting arm 272 via the first barrier wall 231 and the second barrier wall 251 respectively. By doing so, the transmission quality of the electrical signals between the first add-in card 230 and the interface card 210 as well as the transmission quality of the electrical signals between the second add-in card 250 and the interface card 210 are guaranteed. In practical application, the length L1 of the first connecting arm 271 is not equal to the length L2 of the second connecting arm 272. As shown in FIG. 3, the length L1 of the first connecting arm 271 connecting the first add-in card 230 is larger than the length L2 of the second connecting arm 272 connecting the second add-in card 250.

As shown in FIG. 1, the first connector 211 and the second connector 212 are disposed at different positions on the plate 213. The projection position of the first connector 211 on the plate 213 along a normal direction X1 of the first surface 213*a* is located apart from the projection position of the second connector 212 on the plate 213 along a normal direction X2 of the second surface 213*b*. In the present embodiment of the invention, the interface card 210 is, for example, a riser card. The first add-in card 230 and the second add-in card 250 can be electrically connected to a motherboard via the interface card 210 by electrically connecting the first connector 211 and the second connector 212 to the plate 213 respectively via the electrical connecting pins 213*c* (shown in FIG. 2). Examples of the first add-in card 230 and the second add-in card 250 include add-in cards conforming to conventional PCI specifications such as display card, audio card and Network card. The spacer 214 can be implemented by a dummy circuit board.

According to the butterfly interface transfer structure 200 of the embodiment of the invention, the end of the plate 213 near the first barrier wall 231 and the end of the plate 213 near the second barrier wall 232 are parallel and partially overlapped. As shown in FIG. 3, the two barrier walls are parallel and overlapped by a width W. The spacer 214 is disposed between the first connector 211 and the plate 213, such that the distance D1 from the top of the first connector 211 to the first surface 213*a* is longer than the distance D2 from the top of the second connector 212 to the second surface 213*b*, and the insertion height of the first add-in card 230 on the interface card 210 is greater than the insertion height of the second add-in card 250 on the interface card 210. Thus, the width W at which two barrier walls are parallel and overlapped is reduced, the interference between the first barrier wall 231 and the second barrier wall 251 is reduced, and the area available for the disposition of other components such as signal connector, audio connector, Network connector and light emitting diode on the first barrier wall 231 and the second barrier wall 251 is increased.

In the present embodiment of the invention, only one spacer 214 is disposed between the first connector 211 and the plate 213. However, two or more than two spacers can be disposed between the first connector 211 and the plate 213 to reduce the width W according to actual needs. Also, in other embodiments, either one or more spacers 214 can be disposed between the second connector 212 and the plate 213, and the number of the spacer 214 disposed between the second connector 212 and the plate 213 differs from the number of the spacer 214 disposed between the first connector 211 and the plate 213. The present embodiment of the invention does not have any restrictions regarding the number or shape of the spacer 214. Any designs of disposition making the distance D1 from the top of the first connector 211 to the first surface 213*a* different from the distance D2 from the top of the second connector 212 to the second surface 213*b* are within the scope of protection of the invention.

According to the interface card and the butterfly interface transfer structure of the embodiment of the invention, a spacer is disposed between the first connector and the plate, resulting in different insertion heights for the first add-in card and the second add-in card on the interface card. Thus, the width at which the first barrier wall and the second barrier wall are parallel and overlapped is reduced, and the interference between the components on the first barrier wall and the second barrier wall is avoided. And the available area for the disposition of components on the first barrier wall and the second barrier wall is increased. Moreover, in the embodiment of the invention, the gap between the first connector and the plate is easily changed by depositing a spacer, thus there is no need to change the specifications of the first connector and the second connector that are compatible in the conventional butterfly interface transfer structure, avoiding additional cost due to the change in the specifications of the connectors.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An interface card for coupling with a slot of a motherboard, comprising:

a plate having a set of electrical connecting pins, a first surface and a second surface;

a first connector disposed on the first surface and electrically connected to the set of electrical connecting pins;

a second connector disposed on the second surface and electrically connected to the set of electrical connecting pins; and a spacer disposed between the first connector and the plate.

2. The interface card according to claim 1, wherein the distance from the top of the first connector to the first surface is longer than the distance from the top of the second connector to the second surface.

3. The interface card according to claim 1, wherein the first connector is coupled to a first add-in card, which is coupled to the first connector along a normal direction of the first surface.

4. The interface card according to claim 3, wherein the second connector is coupled to a second add-in card, which is coupled to the second connector along a normal direction of the second surface.

5. The interface card according to claim 1, wherein the projection position of the first connector on the plate along a normal direction of the first surface is located apart from the projection position of the second connector on the plate along a normal direction of the second surface.

6. The interface card according to claim 1, wherein the interface card is a riser card.

7. The interface card according to claim 1, wherein the first connector and the second connector are the same.

8. The interface card according to claim 7, wherein the first connector and the second connector are two peripheral component interconnect (PCI) sockets, two peripheral component interconnect express (PCI-E) sockets or two peripheral component interconnect extended (PCI-X) sockets.

9. The interface card according to claim 1, wherein the spacer is a dummy circuit board.

10. A butterfly interface transfer structure, comprising:

an interface card coupled to a slot of a motherboard, wherein the interface card comprises:

a plate having a set of electrical connecting pins, a first surface and a second surface;

a first connector disposed on the first surface and electrically connected to the set of electrical connecting pins;

a second connector disposed on the second surface and electrically connected to the set of electrical connecting pins; and a spacer disposed between the first connector and the plate;

a first add-in card coupled to the first connector; and a second add-in card coupled to the second connector.

11. The interface transfer structure according to claim 10, wherein the distance from the top of the first connector to the first surface is longer than the distance from the top of the second connector to the second surface.

12. The interface transfer structure according to claim 11, wherein the first add-in card has a first barrier wall positioned at one side of the first add-in card, the second add-in card has a second barrier wall positioned at one side of the second add-in card, the first barrier wall and the second barrier wall face toward the same direction, and the interface transfer structure further comprises:

a frame having a first connecting arm and a second connecting arm, wherein one end of the first barrier wall is fixed on the first connecting arm, and one end of the second barrier wall is fixed on the second connecting arm;

wherein the length of the first connecting arm is greater than the length of the second connecting arm.

13. The interface transfer structure according to claim 10, wherein the projection position on the first connector on the plate along a normal direction of the first surface is located apart from the projection position of the second connector on the plate along a normal direction of the second surface.

14. The interface transfer structure according to claim 10, wherein the interface card is a riser card.

15. The interface transfer structure according to claim 10, wherein the first connector and the second connector are the same.

16. The interface transfer structure according to claim 15, wherein the first connector and the second connector are two PCI sockets, two PCI-E sockets or two PCI-X sockets.

17. The interface transfer structure according to claim 10, wherein the spacer is a dummy circuit board.

* * * * *